Patented Apr. 13, 1954

2,675,383

UNITED STATES PATENT OFFICE 2,675,383

NEW BIS-(AMINOTRIAZINES) AND PROCESS FOR THEIR MANUFACTURE

Peter L. de Benneville, Philadelphia, Pa., assignor to Rohm & Haas Company, Philadelphia, Pa., a corporation of Delaware No Drawing. Application March 12, 1952, Serial No. 276,231

12 Claims. (Cl. 260—249.6)

This invention relates to a new class of bis-(aminotriazines) and to their method of preparation. These new compounds have the general formula

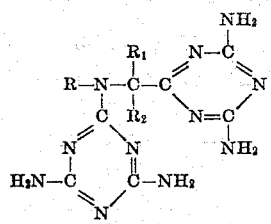

in which R is an alkyl group of one to eight carbon atoms having at least one hydrogen atom on the carbon adjacent the nitrogen, $R_1$ is hydrogen or methyl, and $R_2$ is an alkyl group of one to eight carbon atoms. They may be prepared by the process represented by the equation (1)

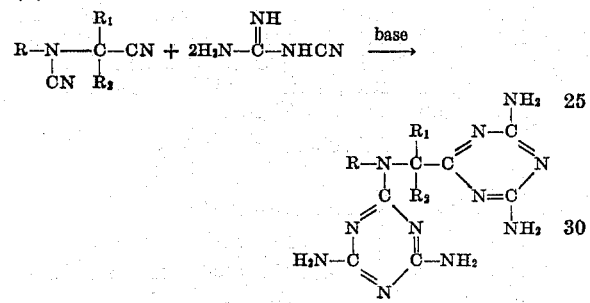

In copending application Serial No. 276,232, filed March 12, 1952, it is shown that the cyanoaminonitriles,

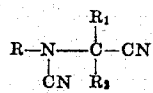

of the class useful in the practice of this invention may be prepared by first forming an aminonitrile by the reaction (2)

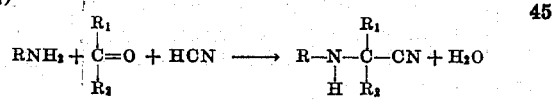

and then reacting the aminonitrile with cyanogen chloride according to the equation (3)

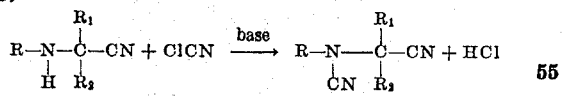

In reaction (2) the primary amine may be methylamine, ethylamine, propylamine, isopropylamine, normal butylamine, isobutylamine, secondary butylamine and 2-ethylhexylamine. The carbonyl compound $R_1COR_2$ should be one in which $R_1$ is hydrogen or methyl and $R_2$ is methyl, ethyl up to octyl. Representative carbonyl compounds are acetaldehyde, propionaldehyde, nonyl aldehyde, acetone and methyl ethyl ketone. Reactions (2) and (3) are both carried out at room temperature or slightly above and in the case of reaction (3) an inert diluent such as benzene should be used.

Reaction (1), between the cyanoaminonitrile and dicyanodiamide, is carried out in an inert solvent such as a lower alcohol and in the presence of a small amount of alkaline catalyst such as sodium hydroxide, potassium hydroxide or lime. The reaction is carried out at reflux temperature and is usually accompanied by an exotherm. The bis-(aminotriazine) precipitates from the reaction medium as it is formed and is readily freed from excess dicyanodiamide by a hot water wash.

The following examples illustrate the practice of the invention.

EXAMPLE 1

A. *Preparation of*—

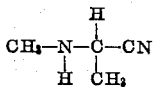

A benzene solution of 34 parts of methylamine is cooled to 5° C. in a vessel equipped with a stirrer, a cooling jacket and an ice water condensing system. Forty-seven parts of acetaldehyde was added over a period of one-half hour and then 29.5 parts of anhydrous hydrogen cyanide was added over a period of fifteen minutes. Stirring and cooling were maintained during these additions, and thereafter the stirring was continued for one hour while the reaction mixture was allowed to come to room temperature. It was allowed to stand overnight at room temperature. The benzene layer was then separated and distilled to yield 44 parts of water-white aminonitrile boiling at 70°–78° C. at 34 mm.

B. *Preparation of*—

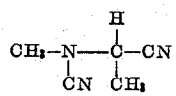

To a solution of the 44 parts of aminonitrile as prepared in part A in 80 parts of benzene there was added first 16 parts of cyanogen chloride, then 36.5 parts of anhydrous potassium carbonate in 32 parts of water, and finally an additional 16.2 parts of cyanogen chloride. The solution was stirred during these additions and external cooling means applied. The rate of addition was adjusted to keep the temperature below 35° C.

Stirring was continued for one and one-half hours after all ingredients were added, and the benzene layer was then separated and distilled to yield 46 parts of the cyanoaminonitrile. (Distillation range 112°–114° C./5 mm.)

C. *Preparation of—*

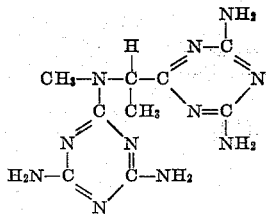

A slurry of 21.8 parts of the cyanoaminonitrile prepared in part B, 37 parts of dicyanodiamide, and 45 parts of isopropanol was heated to refluxing temperature and to it was added over a period of 20 minutes a hot solution of 6.6 parts of potassium hydroxide in 85 parts of isopropanol. Refluxing was continued for eight hours and then the mixture was cooled and filtered. The residue was well washed with hot water at 60° C. and then dried. Twenty-four parts of the bis-(aminotriazine) was obtained as a light tan solid melting above 320° C.

EXAMPLE 2

A. *Preparation of—*

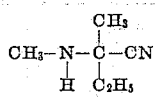

One hundred forty-four parts of methyl ethyl ketone containing one part of piperidine was placed in a reaction vessel equipped with a stirrer and to it was added over a period of 45 minutes 108 parts of anhydrous hydrogen cyanide. During the addition the temperature of the mixture was in the range 25°–45° C. Stirring was continued at room temperature for one and three-quarter hours after all the hydrogen cyanide was added. The mixture was then acidified with 85% $H_3PO_4$ and stripped of excess hydrogen cyanide at 30° C. and water pump vacuum. Fifty-six parts of hydrogen cyanide were removed. To the cyanohydrin thus formed, there was added 62.8 parts of gaseous methylamine in one and three-quarter hours at 7°–15° C. The resulting product distilled mainly at 75°–77° C. at 28 mm. A 68% yield of aminonitrile was obtained as a colorless liquid.

B. *Preparation of—*

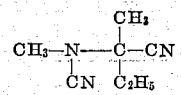

To a solution of 117.5 parts of the aminonitrile as prepared in part A in 125 parts of benzene there was added a solution of 64.4 parts of cyanogen chloride in 55 parts of benzene. The addition was made over a period of 45 minutes during which the mixture was at a temperature within the range 25°–35° C. A solution of 69 parts of anhydrous potassium carbonate in 70 parts of water at a temperature of 20°–25° C. was then added over a period of 15 minutes. The mixture was stirred for one-half hour at room temperature and 15 minutes at 50° C. and then filtered to remove potassium chloride. The benzene layer was distilled and yielded 71 parts of the cyanoaminonitrile, a light yellow oil distilling at 80°–81° C. at 0.3 mm.

C. *Preparation of—*

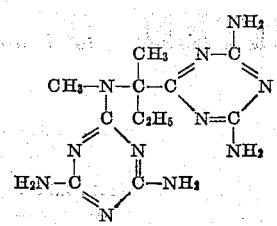

To a refluxing mixture of 41.1 parts of the cyanoaminonitrile of part B, 55.5 parts of dicyanodiamide, and 65 parts of isopropanol there was added over a 35 minute period a solution of 9.9 parts of potassium hydroxide dissolved in 125 parts of isopropanol. The mixture was refluxed for 24 hours, cooled, filtered, and the filter residue washed with hot water and dried. Fifty and one-half parts of the bis-(aminotriazine) was obtained. It is a colorless solid melting above 290° C.

EXAMPLE 3

A. *Preparation of—*

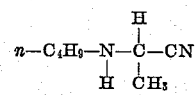

One hundred twenty and one-half parts of butylamine was placed in a reaction vessel equipped with stirrer and external cooling means. To this 106.5 parts of lactonitrile was added over a period of one-half hour. The temperature of the mixture was within the range 27°–40° C. The reaction mixture was stirred for one hour at room temperature and then one-half hour at 50° C. Some water was present as a lower layer and more was separated by the addition of benzene. A total of 16.3 parts of water was separated. The upper oil layer was distilled yielding 170.4 parts of aminonitrile. It is a pale yellow oil boiling at 95°–97° C. at 31 mm.

B. *Preparation of—*

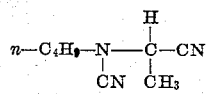

To a solution of 46.1 parts of cyanogen chloride in 44 parts of benzene there was added over a period of 30 minutes a solution of 94.5 parts of aminonitrile as prepared in part A dissolved in 110 parts of benzene. The mixture was stirred throughout the addition and the temperature was kept within the range 20°–35° C. A solution of 51.7 parts of anhydrous potassium carbonate in 53 parts of water was then added over a period of 25 minutes during which the temperature was kept between 25°–35° C. Stirring was continued for one and one-half hours at room temperature. The mixture was filtered and the benzene layer distilled. Ninety-seven and two-tenths parts of cyanoaminonitrile was obtained as a very pale yellow oil boiling at 111°–112° C. at 1.1 mm.

C. *Preparation of—*

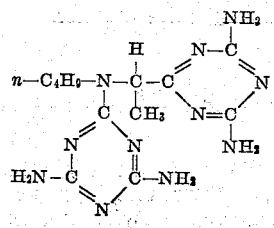

A mixture of 40 parts of isopropanol, 30.2 parts of the cyanoaminonitrile prepared in part B and 37 parts of dicyanodiamide was heated to refluxing temperature (90° C.), and to it was added a solution of 6.6 parts of 85% potassium hydroxide in 79 parts of isopropanol. The mixture was stirred during the addition which was made in 10 minutes. A strong exotherm developed during the addition and practically all the solid went into solution. After refluxing an additional five minutes, the reaction mixture solidified. To this 120 parts of isopropanol was added and the mixture heated for two hours at reflux (86°). The solid was filtered and washed with hot water at 60° C. The washed residue was a tan solid melting at 179°–180° C. It was extracted twice with hot methanol and yielded 31 parts of the purified bis-(aminotriazine). It is a colorless product melting at 210°–211° C.

EXAMPLE 4

A. *Preparation of—*

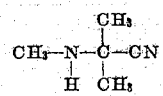

Over a period of two hours 132.2 parts of gaseous monomethylamine was added to 340.4 parts of acetone cyanohydrin. During the addition, the temperature was kept in the range −10° C. to +10° C. The reaction mixture was then stripped at room temperature and used in part B without further purification.

B. *Preparation of—*

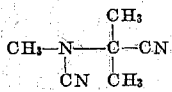

The crude aminonitrile as prepared in part A was mixed at 10° C. with 352 parts of benzene, 276.8 parts of anhydrous potassium carbonate and 128 parts of water. There was then added, at 15°–25° C. and over a period of 65 minutes, 246 parts of cyanogen chloride. Stirring was continued for one-half hour at room temperature and the reaction mixture allowed to stand overnight. It was then heated to 50° C., cooled, the aqueous layer separated, and the benzene layer filtered, dried over anhydrous magnesium sulfate and distilled. There was obtained 213.5 parts of a light brown oil boiling at 89°–90° C. at 2 mm.

C. *Preparation of—*

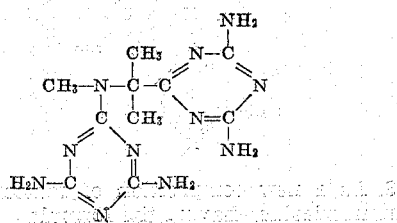

To a stirred mixture of 200 parts of isopropanol, 128.2 parts of the cyanoaminonitrile as prepared in part B, and 193 parts of dicyanodiamide there was added to reflux (75°–85° C.) and over a period of 90 minutes a solution of 35 parts of 85% potassium hydroxide in 400 parts of isopropanol. The mixture was stirred at reflux for 2.5 hours and then cooled. The fine white solid which had formed was filtered off and washed with hot water. Two hundred twenty-six parts of the bis-(aminotriazine) was obtained. It melted at 430°–435° C.

EXAMPLE 5

A. *Preparation of—*

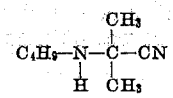

Over a period of 15 minutes and at a temperature of 25°–40° C., 127.4 parts of acetone cyanohydrin was added to 120.5 parts of n-butylamine. Stirring was continued for 75 minutes at room temperature and then for 30 minutes at 50° C. The reaction mixture was cooled to room temperature and benzene added. Seventeen parts of water was separated. The benzene layer was distilled and yielded 182 parts of aminonitrile as a pale yellow liquid boiling at 86°–88° C. at 28 mm.

B. *Preparation of—*

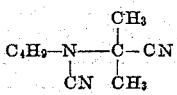

To a stirred solution of 44 parts of benzene and 30.8 parts of cyanogen chloride there was added a solution of 71.3 parts of aminonitrile prepared as in part A in 88 parts of benzene. The addition was made at 20°–40° C. over a period of 30 minutes. A solution of 34.5 parts of anhydrous potassium carbonate in 35 parts of water was then added in 15 minutes at 28°–35° C. The reaction mixture was stirred for two hours at room temperature and 15 minutes at 50° C. It was then cooled, filtered, and the benzene layer distilled. Forty-five parts of cyanoaminonitrile was obtained as a pale yellow liquid boiling at 96° C. at 1 mm.

C. *Preparation of—*

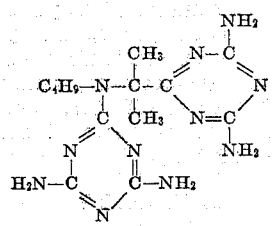

To a stirred mixture of 44 parts of isopropanol, 23.2 parts of cyanoaminonitrile as prepared in part B, and 25.9 parts of dicyanodiamide there was added at reflux (85° C.) a solution of 4.6 parts of 85% potassium hydroxide in 56 parts of isopropanol. The addition was made over a period of 15 minutes by which time all ingredients were in solution. Heating at reflux was continued and after 30 minutes some solid precipitated. The refluxing was continued for an additional six hours and the reaction mixture was then cooled, filtered and washed with hot water. Twenty-two parts of bis-triazine, a white solid melting at 271°–272° C., was obtained.

EXAMPLE 6

A. *Preparation of—*

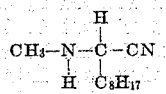

To a mixture of 166 parts of 3,5,5-trimethylhexaldehyde cyanohydrin and 40 parts of benzene there was added 32.5 parts of methylamine. The addition was made to 15°–20° C. over a period of 1.5 hours. The addition of more benzene caused the separation of 16 parts of water which was removed. The benzene layer was then dried over anhydrous sodium sulfate and strippd at 100° C. at 18 mm. There was obtained 168.8 parts of the aminonitrile.

B. *Preparation of—*

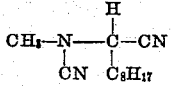

A solution of 98.6 parts of the above aminonitrile in 40 parts of benzene was added at 10°–20° C. and over a 30 minute period to a solution of 33.9 parts of cyanogen chloride in 40 parts of benzene. To this mixture was then added at 10°–15° C. and over a 15 minute period a solution of 34.5 parts of potassium carbonate in 40 parts of water. The reaction mixture was stirred at room temperature for on hour, filterd, and the water layer separated. The benzene layer was distilled to yield 90.5 parts of the cyanoaminonitrile boiling at 133°–140° C. at 1.5 mm.

C. *Preparation of—*

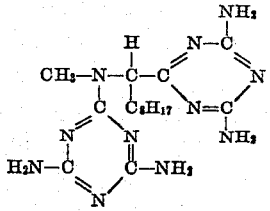

To a mixture of 38.6 parts of the cyanoaminonitrile of part B, 40 parts of isopropanol, and 37 parts of dicyanodiamide there was quite rapidly added at 85° C. a solution of 6.6 parts of potassium hydroxide, reagent grade, in 80 parts of isopropanol. The mixture was refluxed for 22 hours, filtered at room temperature, and the residue washed with hot water (65° C.). On air-drying, there was obtained 40 parts of solid product melting at 256°–258° C.

EXAMPLE 7

A. *Preparation of—*

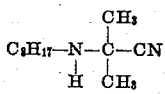

To 68 parts of 2-ethylhexylamine there was added rapidly at 25°–45° C., with cooling, 59.5 parts of acetone cyanohydrin. After the mixture was stirred one hour it was stripped to yield 96 parts of the aminonitrile.

B. *Preparation of—*

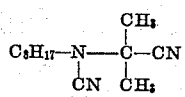

A suspension was formed by stirring 39 parts of the aminonitrile of part A, 40 parts of benzene, and 14.5 parts of anhydrous potassium carbonate in 30 parts of water. Into this suspension was passed 13.6 parts of cyanogen chloride gas over a period of 20 minutes. The water layer was separated, and the benzene layer dried and distilled. Ten parts of the cyanoaminonitrile boiling at 136°–146° C. at 4.5 mm. were obtained.

C. *Preparation of—*

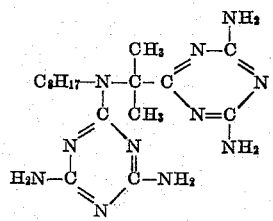

To a mixture of 8 parts of the cyanoaminonitrile of part B, 8.4 parts of dicyanodiamide and 40 parts of isopropanol there was added at reflux a solution of two parts of potassium hydroxide in 35 parts of isopropanol. After refluxing for 12 hours, the mixture was cooled, filtered and the filtrate washed with hot water at 75° C. Six parts of dried bis-(aminotriazine) melting at 243°–246° C. was obtained.

The bis-(aminotriazines) of the class herein described combine with formaldehyde or formaldehyde and an alcohol to yield useful resinous condensation products. Such products are described in copending application Serial No. 276,233, filed on even date herewith, now Patent No. 2,653,143.

I claim:

1. As new compositions of matter, the bis-(amino triazines) having the formula

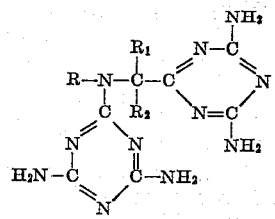

wherein R is an alkyl group of one to eight carbon atoms having at least one hydrogen atom on the carbon atom adjacent to the nitrogen atom, $R_1$ is selected from the group consisting of H and $CH_3$ and $R_2$ is an alkyl group of one to eight carbon atoms.

2. As a new composition of matter, the bis-(aminotriazine) having the formula

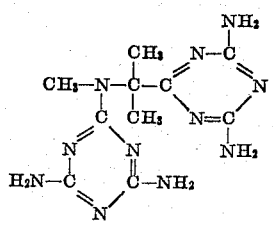

3. As a new composition of matter, the bis-(aminotriazine) having the formula

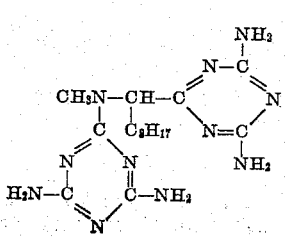

4. As a new composition of matter, the bis-(aminotriazine) having the formula

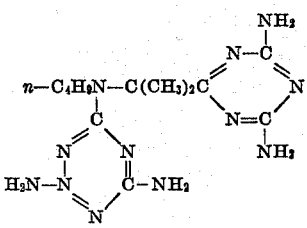

5. The process which comprises reacting under alkaline conditions dicyanodiamide and a cyanoaminonitrile of the formula $$R-\underset{\underset{CN}{|}}{N}-\underset{\underset{R_2}{|}}{\overset{\overset{R_1}{|}}{C}}-CN$$

wherein R is an alkyl group of one to eight carbon atoms having at least one hydrogen atom on the carbon atom adjacent to the nitrogen atom, $R_1$ is selected from the group H and $CH_3$ and $R_2$ is an alkyl group of one to eight carbon atoms.

6. The process which comprises reacting under alkaline conditions dicyanodiamide and a cyanoaminonitrile of the formula

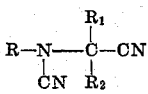

7. The process which comprises reacting under alkaline conditions dicyanodiamide and a cyanoaminonitrile of the formula

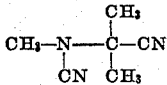

8. The process which comprises reacting under alkaline conditions dicyanodiamide and a cyanoaminonitrile of the formula

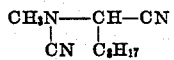

9. As a new composition of matter, the bis-(aminotriazine) having the formula

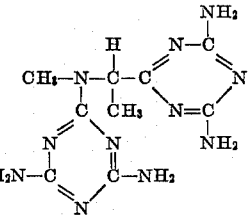

10. As a new composition of matter, the bis-(aminotriazine) having the formula

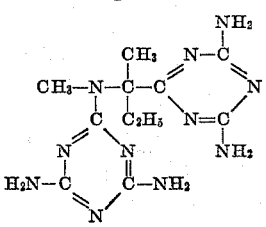

11. The process which comprises reacting under alkaline conditions dicyanodiamide and a cyanoaminonitrile of the formula

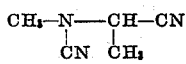

12. The process which comprises reacting under alkaline conditions dicyanodiamide and a cyanoaminonitrile of the formula

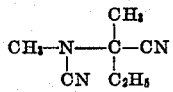

References Cited in the file of this patent

UNITED STATES PATENTS

| Number | Name | Date |
| --- | --- | --- |
| 2,459,397 | Thurston | Jan. 18, 1949 |
| 2,532,519 | Simons | Dec. 5, 1950 |
| 2,606,904 | Kaiser | Aug. 12, 1952 |